(12) United States Patent
Pearcy et al.

(10) Patent No.: US 6,705,669 B1
(45) Date of Patent: Mar. 16, 2004

(54) ENERGY ABSORBER

(75) Inventors: Charles A. Pearcy, Copley, OH (US); Ulf P. Stahl, Shelby Township, MI (US)

(73) Assignee: LPC Acquisitions LLC, Cleveland, OH (US)

( * ) Notice: Subject to any disclaimer, the term of this patent is extended or adjusted under 35 U.S.C. 154(b) by 0 days.

(21) Appl. No.: 10/142,017

(22) Filed: May 9, 2002

(51) Int. Cl.7 .............................................. B60R 21/04
(52) U.S. Cl. ............................ 296/187.05; 296/193.06
(58) Field of Search ................................. 296/189, 188, 296/203.03, 146.6, 187.05, 193.06; 280/751, 748; 138/118, 119, 121, 122, 177, 178, 137, 138; 188/371, 377; 293/122, 132, 133

(56) References Cited

U.S. PATENT DOCUMENTS

| | | |
|---|---|---|
| 2,897,603 A | 8/1959 | Behrman |
| 3,881,767 A | 5/1975 | Klees |
| 3,947,056 A | 3/1976 | Schwanz |
| 3,974,467 A | 8/1976 | Tobita et al. |
| 4,273,359 A | 6/1981 | Scholz et al. |
| 4,413,856 A | 11/1983 | McMahan et al. |
| 4,793,384 A | 12/1988 | Lalikos et al. |
| 4,890,877 A | 1/1990 | Ashtiani-Zarandi et al. |
| 5,033,593 A | 7/1991 | Kazuhito |
| 5,040,646 A | 8/1991 | Drefahl |
| 5,102,163 A | 4/1992 | Ishikawa |
| 5,325,893 A | 7/1994 | Takagi et al. |
| 5,345,721 A | 9/1994 | Stein et al. |
| 5,431,445 A | 7/1995 | Wheatley |
| 5,456,513 A | 10/1995 | Schmidt |
| 5,680,886 A | 10/1997 | Ohtsuka |
| 6,092,555 A | 7/2000 | Otsuka |
| 6,199,941 B1 | 3/2001 | Takahara et al. |
| 6,250,711 B1 | 6/2001 | Takahara |
| 6,254,172 B1 | 7/2001 | Takahara |
| 6,302,477 B1 | 10/2001 | Satou |

FOREIGN PATENT DOCUMENTS

| | | |
|---|---|---|
| DE | 2312202 | 9/1974 |
| DE | 3404139 | 8/1985 |
| DE | 2606640 | 12/1985 |
| DE | 3740687 | 8/1989 |
| DE | 3038252 | 4/1990 |
| DE | 4003952 | 8/1991 |
| DE | 19512525 | 4/1996 |
| DE | 19504659 | 8/1996 |
| DE | 19780691 | 10/1999 |
| EP | 0 561 211 A1 | 9/1993 |
| EP | 0 561 211 B1 | 1/1995 |
| WO | WO 98/02335 | 1/1998 |

OTHER PUBLICATIONS

Automotive Engineering, vol. 87, No. 4 (1979), pp. 56 and 57, author unknown.

*Primary Examiner*—Dennis H. Pedder
*Assistant Examiner*—Gregory Blankenship
(74) *Attorney, Agent, or Firm*—Watts Hoffmann Co., L.P.A.

(57) ABSTRACT

An impact energy absorber. The impact energy absorber is a flexible pipe made from a metal foil. The flexible pipe is provided with a substantially sequential spiral shaped concavities and convexes about the periphery of the pipe along a length of the pipe. The pipe defines a cross section that includes a flat segment, first and second side segments that extend from the flat segment, and a segment that connects the first and second side segments. The first and second side segments act as first and second supports. The segment that connects the first and second side segments defines an additional support between the side segments.

22 Claims, 3 Drawing Sheets

ENERGY ABSORBER

FIELD OF THE INVENTION

The present invention relates in general to energy absorbers and, more specifically, to an impact energy absorber for absorbing the energy of a force applied to a panel of an automotive vehicle.

BACKGROUND OF THE INVENTION

In motor vehicles, particularly, in passenger cars, energy absorbers are secured in a space between an interior trim member and a structural member of a vehicle body. For example, energy absorbers may be secured between a pillar, a roof side rail, a header and an interior trim material, such as a pillar garnish or a roof lining. The energy absorbers are designed to absorb a load, such as a head impact of a vehicle occupant, to the interior trim member. The energy absorber deforms to absorb energy from the impact load that is applied in a direction from the interior trim member and to translate the load to the structural member.

One type of energy absorber is described in U.S. Pat. No. 5,680,886 to Ohtsuka. The energy absorber described in the '886 patent is a tube formed of a metal foil core member and sheets of kraft paper that are applied to opposite side surfaces of the foil core member. The core member and the sheets on the opposite side surfaces of the core member are corrugated so that ridges and grooves alternate in a direction of an axis of the pipe.

The pipe disclosed in the '886 patent is formed into a quadrangular shape. The load applied to a quadrangular energy absorber is supported between side walls of the energy absorber that extend between the interior trim member and the structural member. The stiffness of a quadrangular shaped energy absorber depends on the distance between the side walls. As a result, the further the side walls are spaced apart, the less stiff the energy absorber is. The stiffness of the quadrangular energy absorber may be tuned by changing the spacing between the side walls, changing the corner radii of the tube, changing the material the tube is made from, or changing the corrugations of the tube.

There is a need for an improved energy absorber tube that includes one or more supports, between side segments, that support a portion of the applied load and allow the stiffness of the tube to be changed without changing the overall size, the material, or the corrugations of the tube.

SUMMARY

The present disclosure concerns an impact energy absorber. The disclosed impact energy absorber is a flexible pipe or tube made from a metal foil provided with substantially sequential spiral-shaped concavities and convexes about a periphery of the pipe along a length of the pipe. The energy absorbing pipe defines a cross section that includes a flat segment for attachment to an inner or outer body panel, first and second side segments that extend from the flat segment and a segment that connects the first and second side segments. The first and second side segments act as supports for an applied load. The segment that connects the first and side segments is shaped to define a third support between the first and second side segments that support a portion of an applied load.

In one embodiment, the segment that connects the first and second side segments includes a negative draft that acts as a third support for an applied load. In one embodiment, the segment that connects the first and second side segments includes a concavity that acts as a third support for an applied load. In one embodiment, the energy absorber has a substantially kidney-D shaped cross section.

In one embodiment, the energy absorber is used in an automotive body panel assembly. The body panel assembly includes an outer panel and an inner panel positioned to form a space between the inner panel and the outer panel. The impact energy absorber is positioned in the space between the inner panel and the outer panel. The flat surface of the energy absorber is secured to the outer panel or the inner panel.

The energy absorber functions to absorb a load applied to the inner panel. A first portion of the load applied to the inner panel is supported by the first and second segments to absorb a portion of the applied load. A second portion of the applied load is supported by the third support of the energy absorber tube that is in between the first and second side segments.

Additional features of the invention will become apparent and a fuller understanding will be obtained by reading the following detailed description in connection with the accompanying drawings.

DETAILED DESCRIPTION OF THE INVENTION

Figure 5:
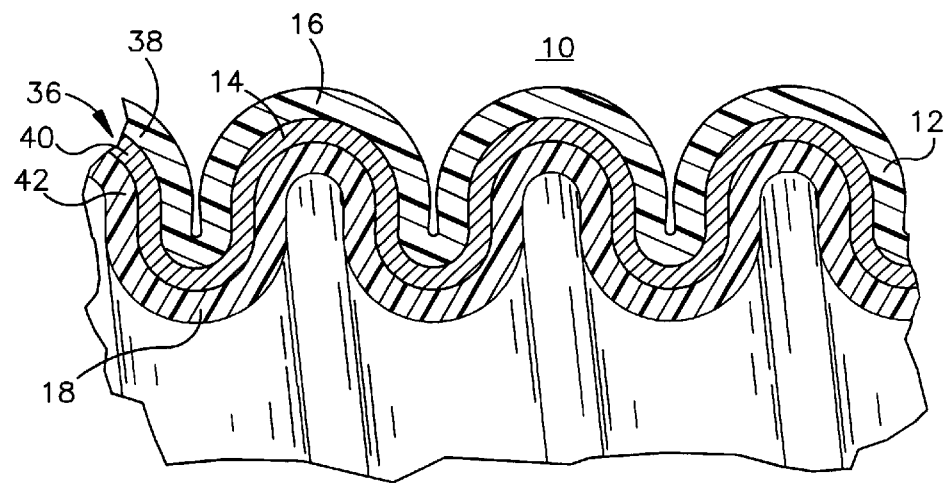
FIG. 5 is a partial sectional view taken along lines 5—5 of FIG. 3 that illustrates corrugations of an energy absorber; and, FIG. 6 is a schematic illustration of an automobile showing locations of an energy absorber.

The present invention is directed to an energy absorber 10. The disclosed energy absorber 10 is a flexible pipe 12 made from a metal foil 14. Referring to FIG. 5, the flexible pipe 12 includes substantially sequential spiral shaped concavities 16 and convexes 18 about a periphery of the pipe along a length of the pipe. In the exemplary embodiment, the flexible pipe 12 defines a cross section that includes a flat segment 20 first and second side segments 22, 24 that extend from the flat segment and a segment 26 that connects first and second side segments 22, 24. The side segments 22, 24 act as first and second supports. The segment 26 defines an additional support 28 between the side segments 22, 24.

Figure 2A:
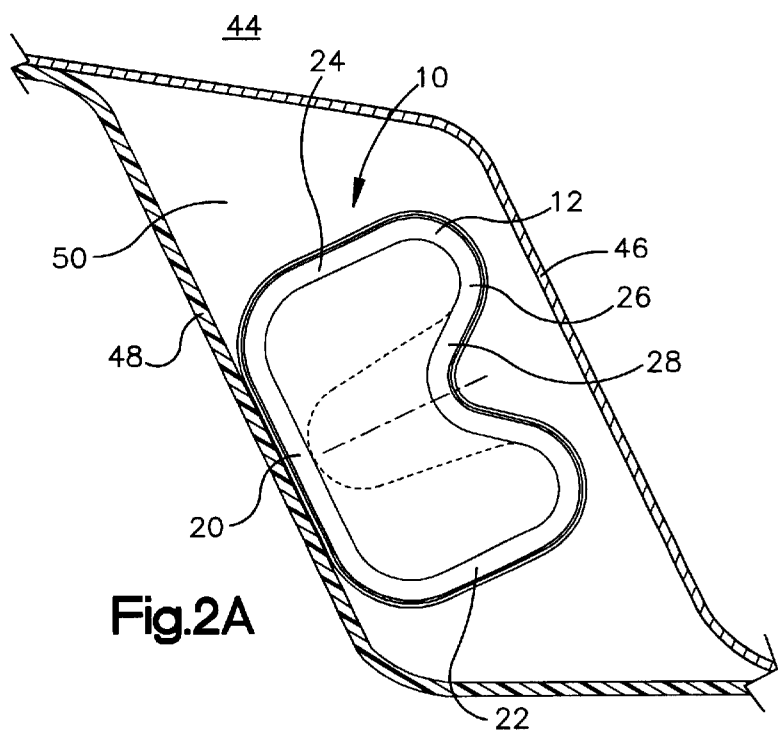
FIG. 2A is a sectional view taken along lines 2—2 in FIG. 1 that illustrates a body panel assembly.

Referring to FIG. 2A, in one embodiment the segment 26 defines a negative draft that defines the additional support 28. The support 28 defined by the negative draft can extend all the way to the flat segment 20 (shown in phantom in FIG. 2A). However, in the exemplary embodiment, the support defined by the negative draft extends only a portion of the way to the flat segment 20.

Figure 2B:
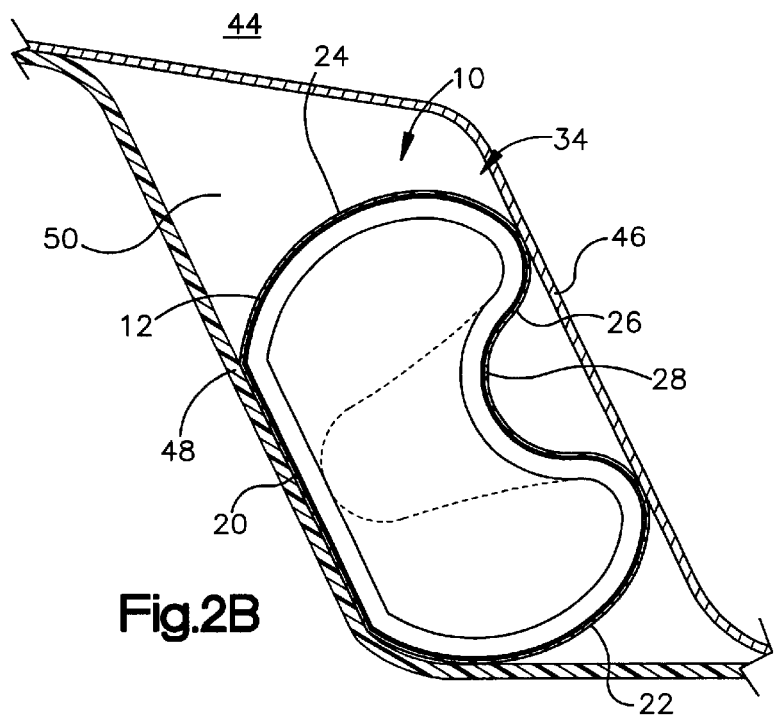
FIG. 2B is a sectional view taken along lines 2—2 in FIG. 1 that illustrates a body panel assembly.
Figure 3:
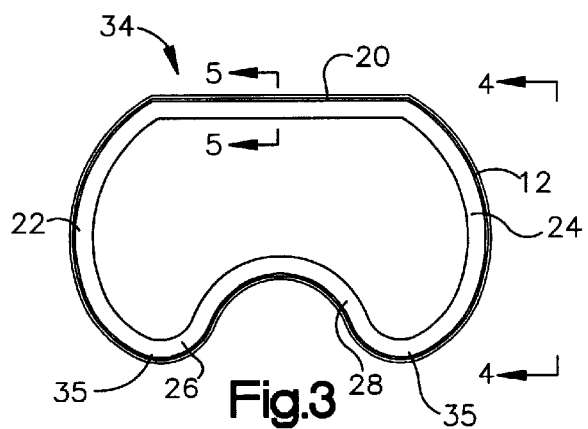
FIG. 3 is a front elevational view of an impact energy absorber.

Referring to FIGS. 2B and 3, in one embodiment, the segment 26 defines a concavity that defines the additional support 28. In the illustrated embodiment, the concavity is a curved surface. The support defined by the concavity can extend all the way to the flat segment 20 (shown in phantom in FIG. 2B). However, in the exemplary embodiment, the concavity extends only a portion of the way to the flat segment 20. The cross section illustrated by FIGS. 2B and 3 illustrates a kidney-D shape 34.

The illustrated energy absorbers include two arcuate segments 35. In the exemplary embodiment, the arcuate segments 35 are symmetric. However, it is contemplated that the arcuate segments 35 may be configured to accommodate varying spaces between panels 46, 48. For example, an energy absorber may have one arcuate segment 35 relatively close to the flat segment 20 and one arcuate segment 35 relatively far away from the flat segment 20 to accommodate a triangular shaped space between panels 46, 48.

Figure 4:
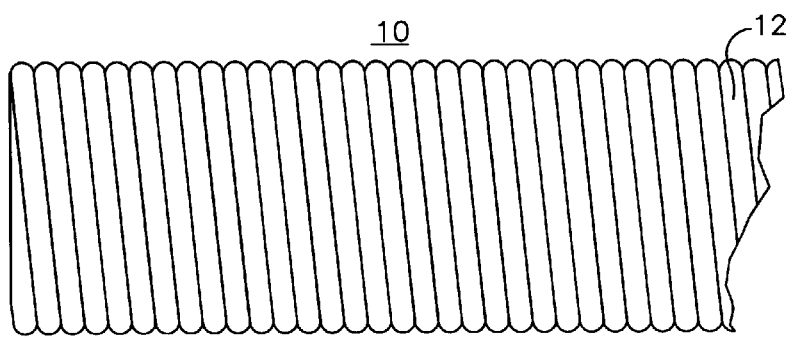
FIG. 4 is an elevational view taken along lines 4—4 of FIG. 3 depicting an energy absorber.

Referring to FIG. 5, the energy absorber 10 is formed from a three layer composite 36 that includes an outside layer material 38, an intermediate layer material 40 and an inner layer material 42. In the illustrated embodiment, the outside and inside layer materials 38, 42 are kraft paper and intermediate layer material 40 is a metal foil 14, such as steel foil, iron foil or aluminum foil. The intermediate layer material 40 may include more than one metal foil layer. For example, two layers of steel or aluminum foil may be used. Tubes of various shapes and sizes made from a variety of composite materials are available from Clevaflex of Cleveland, Ohio. The layer materials 38, 40, 42 form the concavities 16 and convexes 18 in a waveform continuously in the axial direction. Referring to FIG. 4, the concavities 16, and convexes 18 are formed in a spiral form.

Figure 1:
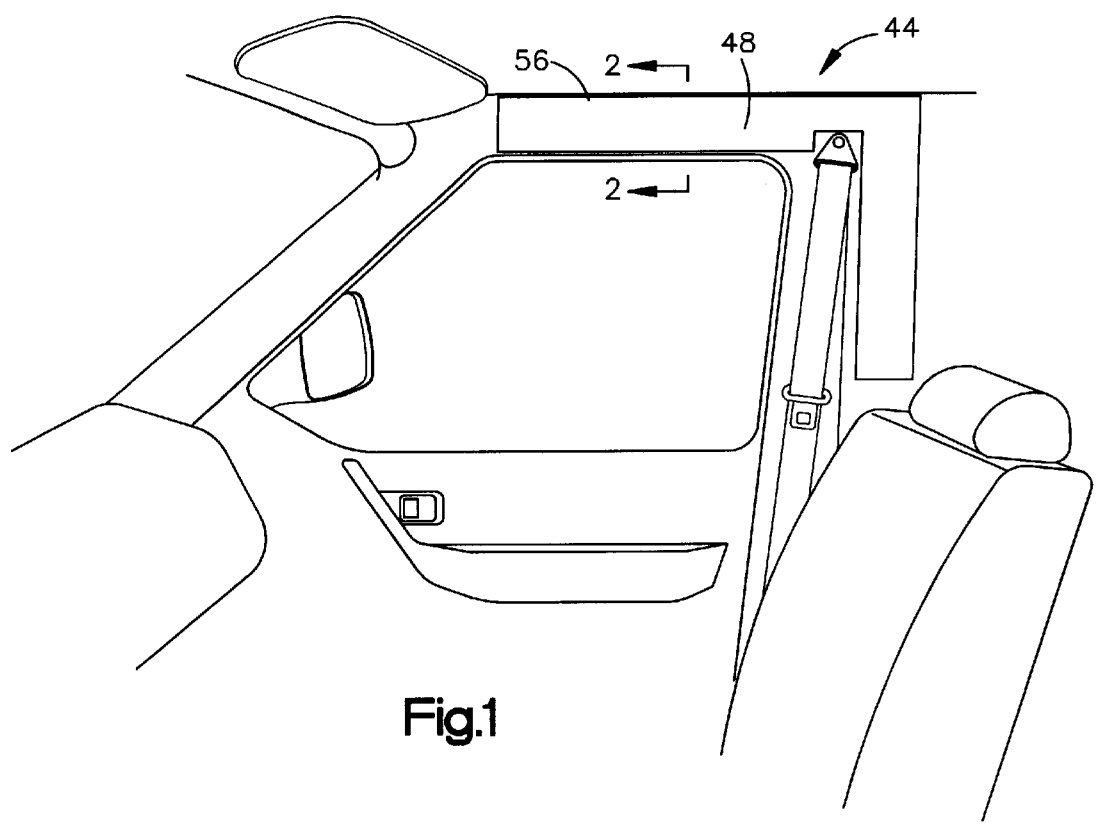
FIG. 1 is a perspective view of a portion of a vehicle as viewed from an interior of the vehicle.

Referring to FIGS. 1, 2A and 2B, in one embodiment the energy absorber 10 is used in a body panel assembly 44. The body panel assembly 44 can be a body panel assembly of a vehicle, such as a car, truck, train or plane. The illustrated body panel assembly 44 is the body panel assembly of an automobile. The body panel assembly 44 includes an outer panel 46, an inner panel 48 and an energy absorber 10. The inner panel 48 is spaced from the outer panel 46 to define a space 50 between the inner and outer body panels. The outer panel 46 is typically a structural member that is made from a metal, such as steel. The inner panel is typically a plastic interior panel or a cardboard panel covered with a fabric. In the illustrated embodiment, the outer panel 46 is a structural panel of an automobile and the inner panel 48 is an interior panel, such as an interior trim member, a pillar garnish or a roof lining. The energy absorber 10 may be mounted to the inner panel 48 or the outer panel 46 with an adhesive or can be attached with fasteners.

In the illustrated embodiment, the flat segment 20 or wall of the energy absorber 10 is secured to the inner panel 48. In an alternate embodiment, the flat segment of the energy absorber 10 is secured to the outer panel 46.

Figure 6:
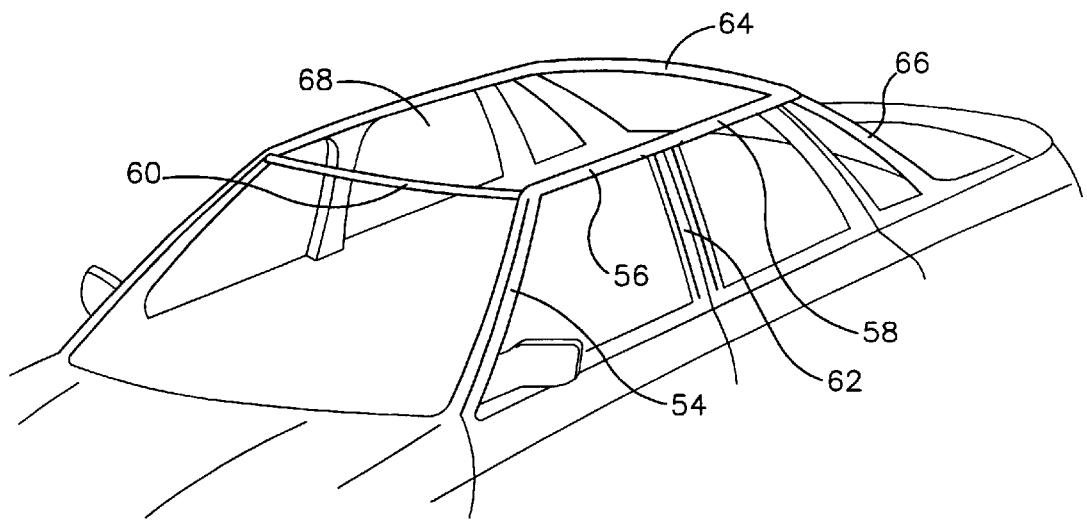

FIG. 1 illustrates that an energy absorber 10 can be mounted to a front side rail 56 of an automobile. It should be readily apparent to those skilled in the art that the disclosed energy absorber 10 can be used in any body panel assembly. For example, FIG. 6 illustrates that the energy absorber 10 can be mounted to an A pillar 54, a front side rail 56, a rear side rail 58, a front header 60, a B pillar 62, a rear header 64, a rear most pillar 66, or in the upper roof 68. When a sliding roof is attached, the energy absorber can be arranged around the sliding roof. In addition, an energy absorber 10 could be mounted in a door, a seat, a dashboard, a kneepad, a knee bolster or any location identified in Federal Motor Vehicle Safety Standards (FMVSS) 201L and 201V.

The energy absorber 10 is designed to absorb an impact to an inner panel 48. For example, the energy absorber 10 absorbs energy of vehicle occupants head that impacts the inner panel 48 of the automobile. The disclosed energy absorber 10 out performs existing energy absorbers because it includes an additional support 28. Existing energy absorbers support an applied load only with the side walls. The disclosed energy absorber supports an applied load with the additional support 28 as well as the side segments. As a result, the disclosed energy absorber is more effective in absorbing applied loads and translating the applied loads to the outer panel 46.

In use, the impact energy absorber absorbs a load, such as a head impact, applied to the inner panel 48. A portion of the load is supported by the first and second side segments 22, 24 or walls. In the exemplary embodiment, the remainder of the load is supported by the additional support 28.

Although the present invention has been described with a degree of particularity, it is the intent that the invention include all modifications and alterations falling within the spirit or scope of the appended claims.

We claim:

1. An impact energy absorber comprising:
   a flexible pipe made from a metal foil provided with substantially sequential spiral-shaped concavities and convexes about a periphery of said pipe along a length of said pipe, said pipe defining a cross section that includes a flat segment, first and second side segments that extend from said flat segment and act as first and second supports, and a segment that connects said first and second side segments and defines an additional support between said side segments, said segment that connects said first and second side segments defining a negative draft that acts as said additional support.

2. The absorber of claim 1 further comprising a composite of kraft paper placed inside and outside said metal foil.

3. The absorber of claim 1 wherein said side segments are curved.

4. An impact energy absorber comprising:
   a flexible pipe made from a metal foil, having a substantially kidney-D shaped cross section, and provided with substantially sequential spiral-shaped concavities and convexes about a periphery of said pipe along a length of said pipe.

5. The absorber of claim 4 further comprising a composite of kraft paper placed inside and outside said metal foil.

6. In an impact absorber that includes a flexible pipe made of a metal foil and provided with substantially sequential spiral shaped concavities and convexes about a periphery of said pipe along a length of said pipe, said pipe defining a cross section that includes a flat segment and first and second side segments that extend from said flat segment that act as first and second supports wherein the improvement comprises a segment that connects said first and second side segments that defines an additional support between said side segments, said additional support being a concavity included in said segment that connects said first and second side segments.

7. The absorber of claim 6 further comprising a composite of kraft paper placed inside and outside said metal foil.

8. The absorber of claim 6 wherein said side segments are curved.

9. An automotive body panel assembly comprising:
   a) an outer panel;
   b) an inner panel positioned to form a space between said inner panel and said outer panel;

c) an impact energy absorber defined by a flexible pipe made from a metal foil provided with substantially sequential spiral-shaped concavities and convexes about a periphery of said pipe along a length of said pipe, said pipe defining a cross section that includes a flat segment secured to one of said inner and outer panels, first and second side segments that act as first and second supports that extend from said flat segment, and a segment that connects said first and second side segments and defines an additional support between said first and second side segments; and, d) said additional support being a negative draft included in said segment that connects said first and second side segments.

10. The panel assembly of claim 9 wherein said side segments are curved.

11. An automotive body panel assembly comprising:
a) an outer panel;
b) an inner panel positioned to form a space between said inner panel and said outer panel; and
c) an impact energy absorber secured in said space between said inner and outer panels, said impact absorber comprises a flexible pipe made from a metal foil, having a substantially kidney-D shaped cross section, and provided with substantially sequential spiral-shaped concavities and convexes about a periphery of said pipe along a length of said pipe.

12. The body panel assembly of claim 11 further comprising a composite of kraft paper placed inside and outside said metal foil.

13. In a body panel assembly that includes an inner panel, an outer panel positioned to form a space between said inner panel and said outer panel and an impact energy absorber secured between said inner and outer panels, said impact absorber defined by a flexible pipe made of a metal foil and provided with substantially sequential spiral shaped concavities and convexes about a periphery of said pipe along a length of said pipe, wherein the improvement comprises said pipe defining a cross section that includes a flat segment connected to said inner panel, first and second side segments that extend from said flat segment that act as first and second supports, and a segment that connects said first and second side segments and defines an additional support between said side segments, said additional support being a concavity included in said segment that connects said first and second side segments.

14. The absorber of claim 13 wherein said side segments are curved.

15. In a body panel assembly that includes an inner panel, an outer panel positioned to form a space between said inner panel and said outer panel and an impact energy absorber secured between said inner and outer panels, said impact absorber defined by a flexible pipe made of a metal foil and provided with substantially sequential spiral shaped concavities and convexes about a periphery of said pipe along a length of said pipe, wherein the improvement comprises said pipe defining a substantially kidney-D shaped cross-section.

16. A method of absorbing a load with an impact energy absorber, comprising:
a) forming an impact absorbing tube that includes a flat mounting surface, first and second side surfaces extending from said mounting surface and a concavity defining surface that connects said first and second side surfaces;
b) securing said mounting surface to an inner automotive body panel;
c) applying a load to an inner automotive body panel;
d) supporting a portion of said applied load with said first and second side segments to absorb a portion of said applied load; and
e) supporting a remainder of said load with said concavity of defining surface.

17. An impact energy absorber comprising:
a flexible pipe made from a metal foil provided with substantially sequential spiral-shaped concavities and convexes about a periphery of said pipe along a length of said pipe, said pipe defining a cross section that includes a flat segment, first and second side segments that extend from said flat segment and act as first and second supports, and a segment that connects said first and second side segments and defines an additional support between said side segments, said segment that connects said first and second side segments defining a concavity that acts as said additional support.

18. In an impact absorber that includes a flexible pipe made of a metal foil and provided with substantially sequential spiral shaped concavities and convexes about a periphery of said pipe along a length of said pipe, said pipe defining a cross section that includes a flat segment and first and second side segments that extend from said flat segment that act as first and second supports wherein the improvement comprises a segment that connects said first and second side segments that defines an additional support between said side segments, said additional support being a negative draft included in said segment that connects said first and second side segments.

19. An automotive body panel assembly comprising:
a) an outer panel;
b) an inner panel positioned to form a space between said inner panel and said outer panel;
c) an impact energy absorber defined by a flexible pipe made from a metal foil provided with substantially sequential spiral-shaped concavities and convexes about a periphery of said pipe along a length of said pipe, said pipe defining a cross section that includes a flat segment secured to one of said inner and outer panels, first and second side segments that act as first and second supports that extend from said flat segment, and a segment that connects said first and second side segments and defines an additional support between said first and second side segments; and,
d) said additional support being a concavity included in said segment that connects said first and second side segments.

20. In a body panel assembly that includes an inner panel, an outer panel positioned to form a space between said inner panel and said outer panel and an impact energy absorber secured between said inner and outer panels, said impact absorber defined by a flexible pipe made of a metal foil and provided with substantially sequential spiral shaped concavities and convexes about a periphery of said pipe along a length of said pipe, wherein the improvement comprises said pipe defining a cross section that includes a flat segment connected to said inner panel, first and second side segments that extend from said flat segment that act as first and second supports, and a segment that connects said first and second side segments and defines an additional support between said side segments, said additional support being a negative draft included in said segment that connects said first and second side segments.

21. A method of absorbing a load with an impact energy absorber, comprising:

a) securing an impact absorbing tube having first and second side segments that act as first and second supports and an additional support defined between said first and second side segments in a space between an outer automotive body panel and an inner automotive body panel;

b) applying a load to said inner panel;

c) supporting a first portion of said applied load with said first and second side segments to absorb a portion of said applied load; and, d) supporting second portion of said load with additional support, said additional support being a negative draft of an additional segment that interconnects said first and second side segments.

22. A method of absorbing a load with an impact energy absorber, comprising:

a) securing an impact absorbing tube having first and second side segments that act as first and second supports and an additional support defined between said first and second side segments in a space between an outer automotive body panel and an inner automotive body panel;

b) applying a load to said inner panel;

c) supporting a first portion of said applied load with said first and second side segments to absorb a portion of said applied load; and, d) supporting second portion of said load with additional support, said additional support being a concavity of an additional wall that interconnects said first and second side segments.

* * * * *